Patented May 13, 1924.

1,493,798

UNITED STATES PATENT OFFICE.

OSWALD C. BEHSE, OF HOUSTON, TEXAS.

PROCESS OF MANUFACTURING ARSENIC ACID.

No Drawing.    Application filed August 7, 1923.  Serial No. 656,303.

*To all whom it may concern:*

Be it known that I, OSWALD C. BEHSE, a citizen of the United States, residing at Houston, Harris County, Texas, have invented a certain new and useful Improvement in Processes of Manufacturing Arsenic Acid, of which the following is a full, clear, and exact description, such as will enable others skilled in the art to which it appertains to make and use the same.

My invention relates to a process of manufacturing arsenic acid.

In the manufacture of arsenic acid by processes now in use, it is common to add slowly to white arsenic (arsenious oxide) a definite proportion of nitric acid. The process is necessarily a slow one due to the chemical inactivity of the two ingredients. The white arsenic must be of highest purity, ninety-nine (99%) per cent pure or better, to obtain results, and grades less pure can not be used. The cost of the oxide is necessarily higher than would be the case if ordinary grades of white arsenic could be used.

It is an object of my invention to provide a process of forming arsenic acid by means of which the time consumed in the manufacture is greatly lessened. It is also desired to make it possible to use the cheaper grades of arsenious oxide not now used.

In carrying out my invention, I find that the addition of hydrochloric acid, or some similar chlorine combination, to the arsenious oxide will greatly increase the chemical activity when the nitric acid is added. The arsenic acid is manufactured in the usual manner. A predetermined amount of nitric acid is used of a suitable specific gravity and the arsenious oxide is gradually mixed therein. Hydrochloric acid is added at intervals in a total amount of about .02 to .06 of one per cent of the total mass of the batch treated. To this may be added one quarter of the total hydrochloric acid before the arsenious oxide is added; the second quarter when about one third of the arsenious oxide has been mixed into the vat or kettle; the third quarter when about two thirds of the arsenious oxide has been added and the last quarter added immediately after the last of the oxide has been dropped into the kettle. This manner of adding the hydrochloric acid may be varied, the object being to add the same gradually while the arsenious oxide is mixed in. It may be added drop by drop, leaving a small quantity of the hydrochloric acid to be added when the oxide is all in.

The hydrochloric acid is broken up and chlorine liberated. The release of the chlorine in its nascent state acts as a catalytic agent which greatly hastens the process by increasing and intensifying the chemical activity of the arsenious oxide and the nitric acid whereby they combine much more readily. The hydrochloric acid has no harmful effect and does not alter the chemical composition of the arsenic acid which is produced.

The advantages of this process are that the time of manufacturing the batch may be reduced from one hour to as much as ten hours, the time being affected by the amount of impurities in the oxide and also by the nature of the impurities. By the use of the nitric acid, some grades of arsenious oxide both crude and refined, may be used which otherwise would be of such inert chemical activity as not to be practicable for this purpose. This impure arsenious oxide may be 20 per cent cheaper than the grades now available when no hydrochloric acid is employed. Hydrochloric acid is used because it is cheap and readily handled. The invention contemplates the use, however, of compounds from which chlorine is released in its nascent state on mixing with the nitric acid.

The further objects and advantages of my invention will be apparent to one skilled in the art. What I claim as new and desire to protect by Letters Patent is:

1. A process of forming arsenic acid, comprising the mixing of arsenious oxide and nitric acid, and gradually adding to this mixture a small proportion of hydrochloric acid as a catalytic agent.

2. A process of forming arsenic acid comprising the mixing of arsenious oxide with nitric acid and gradually adding from .02 to .06 of one per cent of the batch by weight of hydrochloric acid to act as a catalytic agent.

3. In the forming of arsenic acid by the gradual mixing of arsenious oxide with a quantity of nitric acid, the improvement consisting of adding at intervals a small quantity of hydrochloric acid to a total amount of approximately .04 of one per cent of the total weight of the batch treated.

4. In the forming of arsenic acid by the gradual mixing of arsenious oxide with a quantity of nitric acid, the improvement consisting of gradually adding small quantities of chlorine compound in amount to constitute a small fraction of one per cent of the total weight of the batch treated.

In testimony whereof, I hereunto affix my signature this the 3rd day of August, A. D. 1923.

OSWALD C. BEHSE.